US010556623B2

(12) United States Patent
Goia et al.

(10) Patent No.: US 10,556,623 B2
(45) Date of Patent: Feb. 11, 2020

(54) METAL CROSS MEMBER WITH COMPOSITE FIBRE SUBFRAME

(71) Applicant: SISTEMI SOSPENSIONI S.p.A., Corbetta (IT)

(72) Inventors: Marco Goia, Turin (IT); Andrea Santini, Collegno (IT)

(73) Assignee: Sistemi Sospensioni S.p.A., Corbetta (IT)

( * ) Notice: Subject to any disclaimer, the term of this patent is extended or adjusted under 35 U.S.C. 154(b) by 44 days.

(21) Appl. No.: 15/560,253

(22) PCT Filed: Mar. 22, 2016

(86) PCT No.: PCT/IB2016/051599
§ 371 (c)(1),
(2) Date: Sep. 21, 2017

(87) PCT Pub. No.: WO2016/151482
PCT Pub. Date: Sep. 29, 2016

(65) Prior Publication Data
US 2018/0065666 A1  Mar. 8, 2018

(30) Foreign Application Priority Data

Mar. 23, 2015 (IT) ........................... TO2015A000180

(51) Int. Cl.
*B62D 21/11* (2006.01)
*B62D 29/00* (2006.01)
(Continued)

(52) U.S. Cl.
CPC ............ *B62D 21/11* (2013.01); *B62D 21/155* (2013.01); *B62D 25/085* (2013.01);
(Continued)

(58) Field of Classification Search
CPC ...... B62D 21/11; B62D 21/03; B62D 21/152; B62D 21/155; B62D 29/004; B62D 29/00;
(Continued)

(56) References Cited

U.S. PATENT DOCUMENTS 9,650,083 B2 * 5/2017 Graefe ................... B29C 43/16
2012/0315414 A1  12/2012 Wesch et al.
2013/0168939 A1 * 7/2013 Buschjohann ........... B62D 3/12
280/124.109

FOREIGN PATENT DOCUMENTS

EP    0594131 A1   4/1994
EP    2399727 A1  12/2011
(Continued)

OTHER PUBLICATIONS

International Search Report and Written Opinion of the International Searching Authority for PCT International Application No. PCT/IB2016/051599 dated Aug. 1, 2016 (12 pages).

*Primary Examiner* — Keith J Frisby
(74) *Attorney, Agent, or Firm* — Howard & Howard Attorneys PLLC

(57) ABSTRACT

Cross-member for a motor-vehicle front suspension, comprising a first structure of metal, a second structure of composite material joined to the first structure and a plurality of mounting members connected to each other by the first structure to allow mounting of one or more components of the front suspension onto the cross-member, wherein the second structure comprises a base body wholly made of a composite material with a polymer matrix and at least one reinforcement element securely connected to the base body in predetermined areas thereof to contribute to the mechanical strength and stiffness of the whole cross-member whereby the second structure includes a main portion extending in a transverse direction, a pair of longitudinal
(Continued)

appendages projecting rearwards from the opposite ends of the main portion, and a pair of struts extending upwards each from a respective longitudinal appendage.

5 Claims, 2 Drawing Sheets

(51) Int. Cl.
*B62D 25/08* (2006.01)
*B62D 21/15* (2006.01)
*B29L 31/30* (2006.01)

(52) U.S. Cl.
CPC ......... *B62D 25/088* (2013.01); *B62D 29/004* (2013.01); *B29L 2031/3002* (2013.01); *B60G 2206/606* (2013.01)

(58) Field of Classification Search
CPC .. B62D 29/001; B62D 29/002; B62D 29/005; B62D 25/08; B62D 25/082; B62D 25/084; B62D 25/085; B62D 25/088; B62D 25/20; B29L 2031/3002; B60G 2206/60; B60G 2206/602; B60G 2206/604; B60G 2206/606
USPC .................. 180/312, 299; 280/124.109, 788; 296/204
See application file for complete search history.

(56) References Cited

FOREIGN PATENT DOCUMENTS

| | | | |
|---|---|---|---|
| EP | 2399727 A1 | 12/2011 | |
| EP | 2569175 B1 | 3/2015 | |
| EP | 2990308 A1 * | 3/2016 | ............ B29C 43/16 |
| FR | 2834926 A1 | 7/2003 | |
| FR | 2834926 A1 | 7/2003 | |
| WO | 2011072889 A1 | 6/2011 | |
| WO | 2011072889 A1 | 6/2011 | |
| WO | 2011141538 A1 | 11/2011 | |

* cited by examiner

METAL CROSS MEMBER WITH COMPOSITE FIBRE SUBFRAME

CROSS-REFERENCE TO RELATED APPLICATIONS

The present application is a National Stage of International Patent Application No. PCT/IB2016/051599, filed on Mar. 22, 2016, which claims priority to and all the benefits of Italian Patent Application No. 102015902340046, filed on Mar. 23, 2015, both of which are hereby expressly incorporated herein by reference in their entirety.

BACKGROUND OF THE INVENTION

1. Field of the Invention

The present invention relates to a cross-member for a motor-vehicle front suspension, that is to say, to the structural element that is typically used in the automotive field to connect part of the vehicle front suspension to the vehicle body. The present invention also relates to a method for manufacturing a cross-member for a motor-vehicle front suspension.

2. Description of the Related Art

A cross-member of the above-identified type is known from EP 2 569 175 in the Applicant's name.

A number of conflicting requirements have to be met by the designer during the designing of components for a motor-vehicle suspension, such as a cross-member for a front suspension. In particular, a component for a motor-vehicle suspension must be able to bear certain types of loads (the so-called fatiguing loads) which are applied during the normal use of the vehicle, even under heavy conditions. These loads are applied alternately onto the component and the latter must be free of cracks or breakings up to a certain number of fatigue cycles applied. Another structural requirement that must be met by the component is the ability to deform (with a limited plasticization only) in a foreseeable manner under so-called "misuse" loads, that is to say under limit conditions of use (for example during impacts). The component must be able to bear any of these types of load without breakings in any zones thereof, so as to ensure connection with the other components of the vehicle. Moreover, the component must meet suitable requirements in terms of static and dynamic stiffness where the component is attached or connected to the other components of the vehicle. The above-mentioned requirements must be met during the entire lifetime of the component, although the component is subject to wear and aging over time, mainly due to climate factors and atmospheric agents, such as for example temperature, humidity, UV radiations, etc.

SUMMARY OF THE INVENTION

It is an object of the present invention to provide a cross-member which is able to offer better performances than the prior art. This and other objects are fully achieved according to the invention by virtue of a cross-member having the characteristics described herein, as well as by virtue of methods for manufacturing a cross-member as described herein.

Advantageous embodiments of the invention are specified in the dependent claims, the subject-matter of which is to be regarded as forming an integral and integrating part of the following description.

In short, the invention is based on the idea of providing a cross-member comprising a first structure of metal, a second structure of composite material joined to the first structure and a plurality of mounting members connected to each other by the first structure to allow mounting of one or more components of a motor-vehicle front suspension onto the cross-member, wherein the second structure comprises a base body wholly made of a composite material with a polymer matrix and at least one reinforcement element securely connected to the base body in predetermined areas thereof, and wherein the second structure includes a main portion extending in a transverse direction, a pair of longitudinal appendages projecting rearwards from the opposite ends of the main portion, and a pair of struts extending upwards each from a respective longitudinal appendage.

In a cross-member according to the invention, therefore, the first structure (metal structure) not only defines the position of the mounting members but also contributes to the mechanical strength and stiffness of the cross-member, the base body of composite material (which is part of the second structure) has the function of defining the general shape of the cross-member, of providing the base onto which the reinforcement element (or elements) must be joined and of further contributing to the mechanical strength and stiffness of the cross-member, while the reinforcement elements (which are also part of the second structure) have the function of contributing to the mechanical strength and stiffness of the cross-member, the contribution to the mechanical strength and stiffness provided by the reinforcement elements being generally comprised between 30% and 70% of the overall mechanical strength and stiffness of the cross-member, respectively.

The first structure may be made as a truss structure comprising a plurality of connecting elements of metal having cross-sections of various shapes (solid or hollow circular cross-section, solid or hollow rectangular cross-section, I-shaped cross-section, T-shaped cross-section, etc.).

In one embodiment, the second structure is overmoulded on the first structure.

The base body is preferably obtained by injection moulding, thermoforming, in-situ polymerization or resin transfer moulding.

The reinforcement elements may be made of metal, for example steel (by hot- or cold-forming process), aluminium (by hot- or cold-forming, casting, forging or extrusion process), magnesium (by casting process) or composite material with a polymer matrix.

The polymer matrix of the composite material of the base body, and possibly of the reinforcement elements as well, is made for example of a thermoplastic or thermosetting polymer (such as for example epoxy resin), while the reinforcing fibres of the composite material may be randomly-oriented short fibres or oriented fibres. The fibres may be made of carbon, Kevlar, glass or any other material adapted to provide the composite material with the required mechanical properties.

Where the reinforcement elements are made of a composite material with a polymer matrix, they may be connected to the base body by heat welding, i.e. by heating of the base body and of the reinforcement elements up to a temperature such as to fuse the respective polymer matrices and allow therefore to weld them.

Moreover, where the reinforcement elements are made of a composite material with a polymer matrix, they may be made of one or more overlapped layers of composite material, the orientation of the fibres, the texture of the fibres and the overlapping sequence of the various layers being chosen so as to provide each reinforcement element with the desired mechanical strength.

BRIEF DESCRIPTION OF THE DRAWINGS

Further characteristics and advantages of the present invention will become more apparent from the following detailed description, given purely by way of non-limiting example with reference to the appended drawings, where.

DETAILED DESCRIPTION OF THE INVENTION

Figure 1:
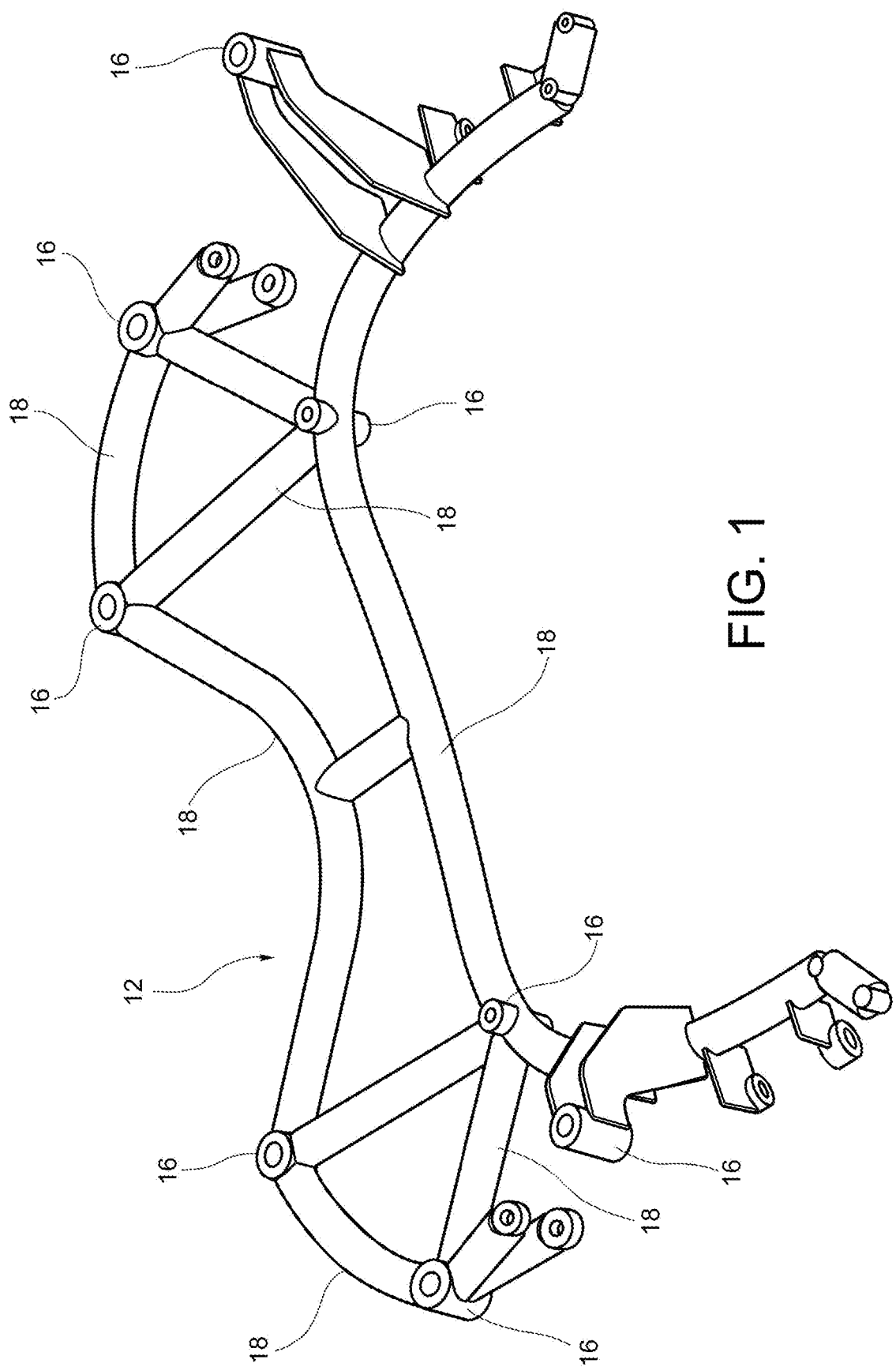
FIG. 1 is a perspective view of the first structure (metal structure) of a cross-member for a motor-vehicle front suspension according to an embodiment of the present invention.
Figure 2:
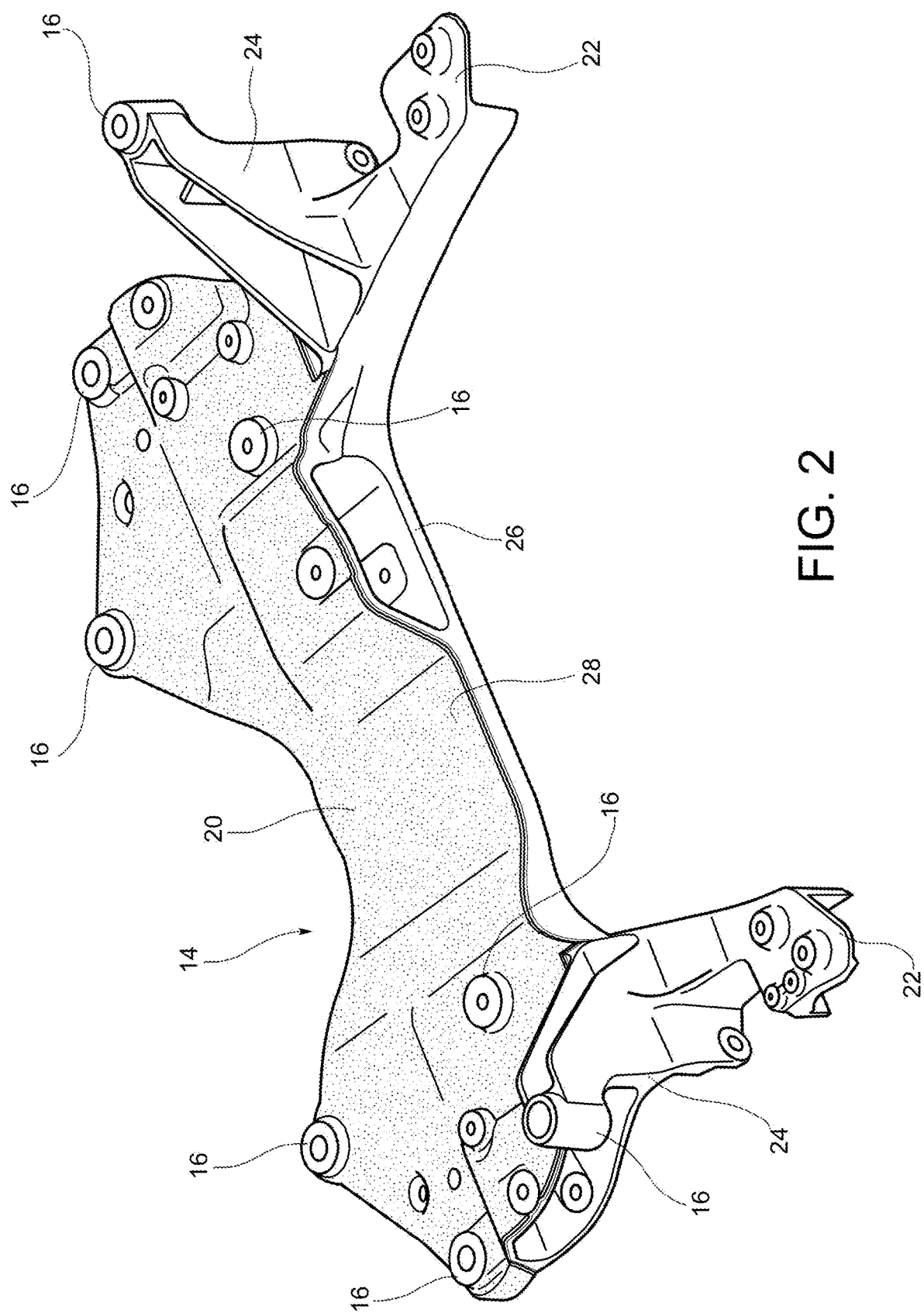
FIG. 2 is a perspective view of the second structure (composite structure) of a cross-member for a motor-vehicle front suspension according to an embodiment of the present invention.

With reference to the drawings, a cross-member for a motor-vehicle front suspension according to an embodiment of the present invention basically comprises a first structure 12 of metal (shown in FIG. 1), a second structure 14 of composite material (shown in FIG. 2) and a plurality of mounting members 16 (shown both in FIG. 1 and in FIG. 2), of per-se-known type, for connection of the cross-member to the vehicle body and for connection of parts (not shown) of the motor-vehicle front suspension (such as swing arms, connecting rods, antiroll bar, etc.) to the cross-member.

The first structure 12 is preferably made as a truss structure and comprises a plurality of rigid connecting elements 18, of straight or curved shape, which connect the mounting members 16 to each other and have cross-sections of various shapes (solid or hollow circular cross-section, solid or hollow rectangular cross-section, I-shaped cross-section, T-shaped cross-section, etc.). The mounting members 16 may be of various shapes, for example of cylindrical shape, and of various materials, in particular of metal or plastics.

The second structure 14 defines the general shape of the cross-member and basically includes a suitably shaped main portion 20, which extends in a substantially transverse direction (in the mounted condition of the cross-member on the vehicle), a pair of longitudinal appendages 22 projecting rearwards (in the mounted condition of the cross-member on the vehicle) from the opposite ends of the main portion 20, and a pair of struts 24 extending upwards each from a respective longitudinal appendage 22.

The structural part of the second structure 14, that is to say the main portion 20, the longitudinal appendages 22 and the struts 24, is made as a single body, hereinafter referred to as base body 26, which is made of a composite material with a polymer matrix. The polymer matrix of the composite material of the base body 26 may be made of a thermoplastic or thermosetting polymer. The composite material of the base body 26 further comprises reinforcing fibres, which may be made of carbon, Kevlar, glass, metal or any other material adapted to provide the composite material with the required mechanical properties. The fibres may be oriented fibres or non-oriented short fibres (i.e. randomly-oriented short fibres).

The second structure 14 further comprises one or more reinforcement elements 28 securely connected to the base body 26 in predetermined areas thereof to provide the second structure 14, and hence the whole cross-member, with the required structural properties (mechanical strength and stiffness). In the embodiment illustrated in the drawings, a reinforcement element is for example securely connected to the main portion 20 of the base body 26, but there may be also be reinforcement elements securely connected to front vertical faces of the two struts 24 and/or to rear vertical faces of the two struts 24. Naturally, the number, arrangement and shape of the reinforcement elements 28 may widely differ from those of the present example, depending on the specific application.

In one embodiment, the reinforcement elements 28 are arranged and shaped so as to give a contribution to the overall mechanical strength and stiffness of the cross-member comprised between 30% and 70%. As far as the contribution to the stiffness is concerned, the contribution to the stiffness of the cross-member in the points of connection with the vehicle body (which stiffness is defined as the ratio of the load applied in each point in case of acceleration, braking and/or turning to the resulting displacement of that point along the direction of application of the load) due to the reinforcement elements is preferably comprised between 30% and 70%.

The reinforcement elements 28 may be made of metal, for example steel (by hot- or cold-forming process), aluminium (by hot- or cold-forming, casting, forging or extrusion process), magnesium (by casting process) or composite material with a polymer matrix.

Where the reinforcement elements 28 are made of a composite material with a polymer matrix, the polymer matrix may be made of a thermoplastic or thermosetting polymer and be reinforced by reinforcing fibres that may be made of carbon, Kevlar, glass, metal or any other material adapted to provide the composite material with the required mechanical properties. The fibres may be oriented fibres or non-oriented short fibres (i.e. randomly-oriented short fibres). Each reinforcement element 28 is formed by one or more overlapped layers of composite material, the orientation of the fibres (where oriented fibres are used), the texture of the fibres and the overlapping sequence of the various layers being chosen so as to provide each reinforcement element with the desired characteristics in terms of mechanical strength. Furthermore, where the reinforcement elements 28 are made of composite material with a polymer matrix, these elements may be connected to the base body 26 by heat welding process, that is to say by heating the base body and the reinforcement elements up to a temperature such as to fuse the respective polymer matrices and therefore allow welding of these components of the structural element with each other. Instead of being connected by heat welding, the reinforcement elements 28 made of a composite material with a polymer matrix (but this applies also to reinforcement elements made of metal) may be connected to the base body 26 by overmoulding process.

A structural element according to the invention may be manufactured with a method basically comprising the following steps:

providing the first structure of metal, said structure comprising the mounting members;

providing the reinforcement elements of the second structure of composite material; and overmoulding the base body of the second structure on the first structure and on the reinforcement elements of the second structure, so as to connect the reinforcement elements to the base body of the second structure and the whole second structure to the first structure.

A structural element according to the invention may also be manufactured, where reinforcement elements made of a composite material with a polymer matrix are used, with a method basically comprising the following steps:

provided the first structure of metal, said structure comprising the mounting members;

overmoulding the base body of the second structure, which body is made of a composite material with a polymer matrix, on the first structure;

providing the reinforcement elements of the second structure, which elements are made of a composite material with a polymer matrix; and securely connecting, by heat welding, the reinforcement elements to the base body of the second structure.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A cross-member for a motor-vehicle front suspension, comprising a first structure of metal, a second structure of composite material joined to the first structure and a plurality of mounting members connected to each other by the first structure to allow mounting of one or more components of the front suspension onto the cross-member, wherein the first structure includes a lattice frame comprising a plurality of tubular connecting elements of metal which connect the mounting members to each other, wherein the second structure comprises a base body wholly made of a composite material with a polymer matrix and at least one reinforcement element securely connected to the base body in predetermined areas thereof to contribute to the overall mechanical strength and stiffness of the cross-member, and wherein the second structure includes a main portion extending in a transverse direction, a pair of longitudinal appendages projecting rearwards from the opposite ends of the main portion, and a pair of struts extending upwards each from a respective longitudinal appendage.

2. The cross-member as set forth in claim 1, wherein the contribution to the overall mechanical strength and stiffness of the cross-member given by said at least one reinforcement element is comprised between 30% and 70%.

3. The cross-member as set forth in claim 1, wherein said at least one reinforcement element is made of metal.

4. The cross-member as set forth in claim 1, wherein said at least one reinforcement element is made of a composite material with a polymer matrix.

5. A front suspension for a motor-vehicle comprising a cross-member as set forth in claim 1.

* * * * *